June 5, 1928.
H. J. OSTDIEK ET AL
1,672,622
COPYHOLDER
Filed July 16, 1926 3 Sheets-Sheet 1
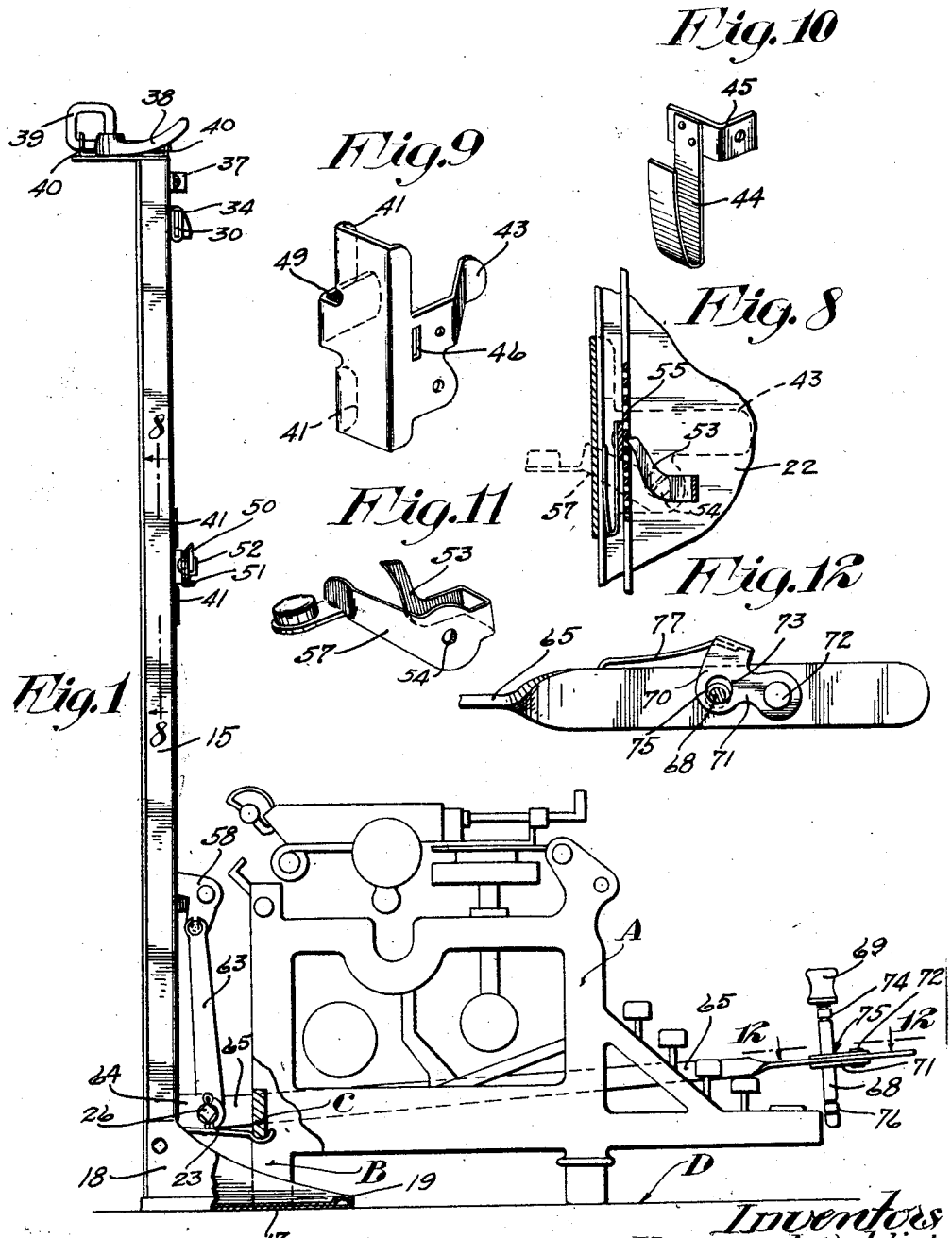
Inventors
Herman J. Ostdiek
Clarence J. Ostdiek
By their Attorneys June 5, 1928.  1,672,622
H. J. OSTDIEK ET AL
COPYHOLDER
Filed July 16, 1926   3 Sheets-Sheet 2
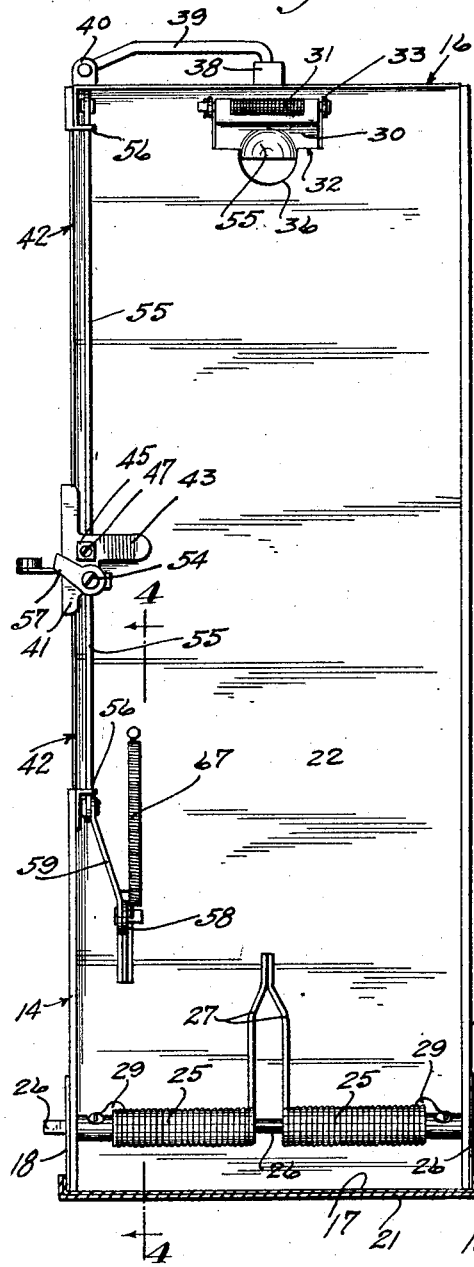
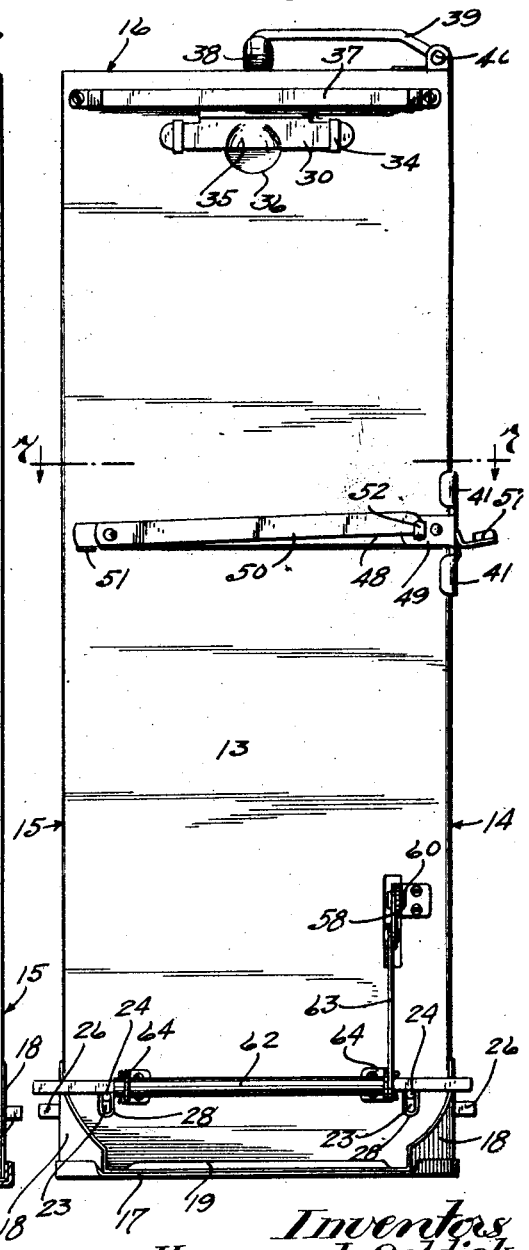
Inventors
Herman J. Ostdiek
Clarence J. Ostdiek
By their Attorneys

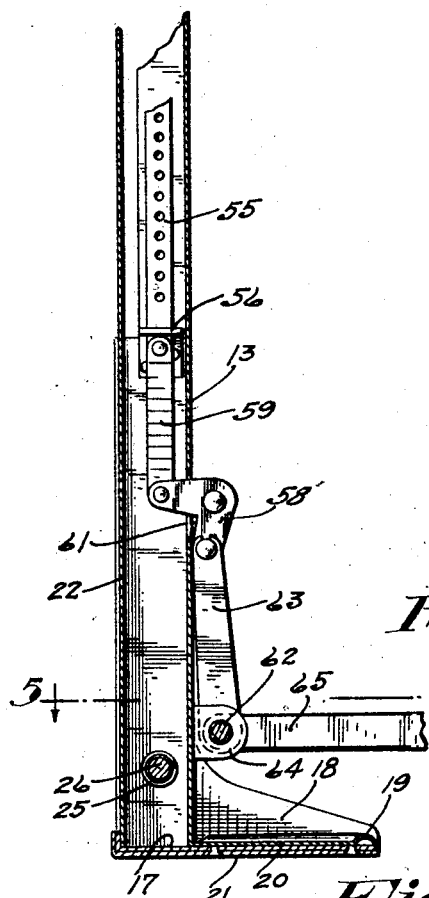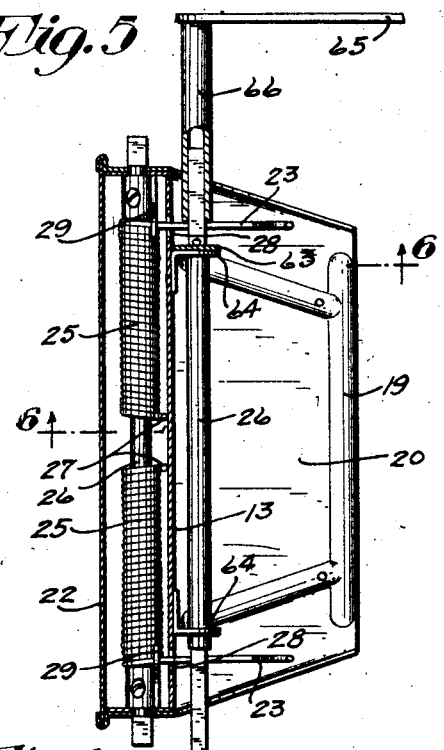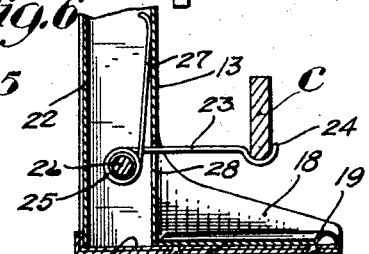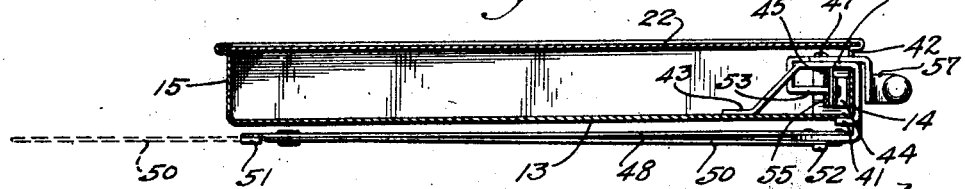

Patented June 5, 1928.

1,672,622

UNITED STATES PATENT OFFICE.

HERMAN J. OSTDIEK AND CLARENCE J. OSTDIEK, OF MINNEAPOLIS, MINNESOTA.

COPYHOLDER.

Application filed July 16, 1926. Serial No. 122,821.

Our present invention relates to improvements in combined copy and note book holders having manually operated line guides and spacers and has for its object to improve the same by increasing the simplicity and efficiency thereof, as will hereinafter appear. For the sake of brevity the invention will be hereinafter referred to as a "copy holder."

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a view of the improved copy holder and a typewriter in left side elevation, some parts being broken away and sectioned;

Fig. 2 is a front elevation of the copy holder removed from the typewriter;

Fig. 3 is a rear elevation of the same with the back plate removed;

Fig. 4 is a detail view with some parts sectioned on the line 4—4 of Fig. 3, on an enlarged scale;

Fig. 5 is a view partly in plan and partly in horizontal section taken on the line 5—5 of Fig. 4;

Fig. 6 is a detail view principally in section taken on the line 6—6 of Fig. 5 and also illustrating in section the rear frame bar of the typewriter;

Fig. 7 is a horizontal section taken on the line 7—7 of Fig. 2, on an enlarged scale;

Fig. 8 is a fragmentary detail view principally in section taken on the line 8—8 of Fig. 1, on an enlarged scale;

Fig. 9 is a perspective view of the slide;

Fig. 10 is a perspective view of the friction shoe;

Fig. 11 is a perspective view of the dog; and

Fig. 12 is a fragmentary detail view with some parts sectioned on the line 12—12 of Fig. 1, on an enlarged scale.

The numeral 13 indicates an upright flat sheet metal body having rearwardly extended side flanges 14 and 15 and a rearwardly extended relatively deep top shelf 16. Said body 13 rests on and is secured to a forwardly extended sheet metal base 17 having forwardly converging upstanding side flanges 18 and reinforcing ribs 19 pressed upward therefrom. Secured by screws to the under side of the base 17 is a base plate 20 covered with a pliable material 21, such as cloth, to prevent the copy holder from marring or scratching the polished surface of a desk on which it is supported.

A displaceable back plate 22 is slidably mounted in grooves in the rear longitudinal edges of the side flanges 14 and 15 from the bottom of the copy holder and the closing movement of said back is limited by the top shelf 16. The bottom plate 20 is secured to the base 17 after the back plate 22 is closed and holds the same in position.

To illustrate the invention in working relation to a typewriter, there is diagrammatically illustrated in Fig. 1 such a machine indicated as an entirety by the character A with the exception of its rear legs B and rear frame bar C.

To permit the copy holder to be placed in a predetermined position back of the typewriter A the base 17 and its side flanges 18 are so designed as to project under the rear legs B and under the rear frame bar C. To releasably secure the copy holder in this position in respect to the typewriter A the same is provided with a pair of forwardly projecting spring arms 23 having hook-like free ends 24 arranged to yieldingly engage the under side of the rear frame bar C. These arms 23 are formed by tangentially extending the outer ends of a pair of axially aligned coiled springs 25 through which a rock shaft 26 axially extends. The end portions of the shaft 26 are journaled in the side flanges 14 and 15, extend outward thereof, and their projecting ends are secured in cross section for the application of a suitable tool for operating said shaft, as will presently appear. The inner ends of the springs 25 are tangentially extended, as indicated at 27, and engage the back of the body 13 as a base of resistance, as best shown in Fig. 6. The spring arms 23 extend through vertical elongated slots 28 in the body 13. A pair of hook-like lugs 29 are secured to the rock shaft 26 and overlie the spring arms 23 for simultaneously pressing the same when the rock shaft 26 is moved in a predetermined direction.

Obviously, by simultaneously pressing the spring arms 23 the same may be freely inserted under the rear frame bar C and then released to secure the copy holder thereto. A like movement of the spring arms 23 will also release the same from the typewriter. For holding a copy sheet, not shown, against the front face of the body 13 there is provided a yieldingly held clamping bar 30 having at the intermediate portion of its upper edge a rearwardly extended spring hinge 31 that extends through a slot 32 in the body 13 and attached to bearing ears 33 on the back of the body.

On the end portions of the clamping bar 30 are rubber bands 34 that are provided to increase the frictional engagement between said clamping bar and a copy sheet. Said clamping bar is arranged to engage the top portion of a copy sheet and hold the same pressed against the front face of the body 13. The front lower edge portion of the clamping bar 30 is outwardly bulged to afford a finger hold 35 by which said bar may be raised and the body 13, at the slot 32, is notched at 36 to afford free access to said finger hold.

To hold a note book, not shown, there is provided a horizontal retaining bar 37, the end portions of which are rearwardly offset and secured to the front face of the body 13 above the clamping bar 30. The retaining bar 37 is adapted to hold a note book at its bound edge by having one of the covers thereof inserted between the body 13 and said bar, from the top thereof. The other cover of the book and its leaves as they are turned over the shelf 16 are held by a weight 38. This weight 38 is carried by the arm 39 that normally extends parallel over the shelf 16 and is hinged thereto at 40 for vertical swinging movement.

The line guide and spacer includes a channeled slide 41 mounted for vertical sliding movement on the side flange 14 with one of its flanges having sliding contact with the front face of the body 13 and its other flange extends into a long vertical notch 42 formed in the rear edge portion of said flange 14 and has sliding engagement with the rear end of said flange in the notch 42. Formed with the rear flange of the slide 41 is an inwardly extended pressure finger 43 arranged to engage the back of the body 13 for vertical sliding movement thereon and hold said slide against transverse annular movement on the flange 14 by an outward pull on the outer flange of the slide 41. The slide 41 is yieldingly and frictionally held against the flange 14, where set, by a shoe 44 in the form of a U-shaped spring, one arm of which is secured to an angle bracket 45 on said slide, and its other or free arm is arranged to slide on the inner face of the side flange 14. The angle bracket 45 is secured to the rear side flange of the slide 41 by having one of its members inserted through a slot 46 and secured to said flange by a screw 47.

One end of a horizontal main straight edge bar 48 is secured to a relatively long lug 49 formed by bifurcating the right-hand flange of the slide 41 and laterally offsetting the same therefrom. This straight edge bar 48 is held parallel to the face of the body 13 and spaced outward thereof for vertical movement over a copy sheet or the leaf of a note book. A supplemental straight edge bar 50 has one of its ends pivoted to the free end of the main straight edge bar 48 for vertical swinging movement parallel thereto. When the supplemental straight edge bar 50 is adjusted to form an extension of the main straight edge bar 48 the same is supported on a stop lug 51 on said straight edge bar 48. A hook-like lug 52 on the lug 49 is provided to support the free end of a supplemental straight edge bar 50 when folded as shown in Fig. 2.

The following connections are provided for lowering the slide 41 step by step to intermittently move the straight edge bars 48 and 50 from line to line over the face of a copy sheet or the leaf of a note book on the copy holder, to wit:

A gravity held dog 53 is pivoted at 54 to the rear side flange of the slide 41 for cooperation with a ratchet bar 55 mounted for vertical endwise movement in upper and lower bearing brackets 56 on the inner face of the side flange 14. This ratchet bar 55 is provided with a multiplicity of longitudinally spaced holes in any one of which the dog 53 will enter and interlock therewith during a downward movement of the ratchet bar 55 and secure the slide 41 to said bar for common movement therewith. During an upward movement of the ratchet bar 55 the dog 53 will move over said bar with a ratchet-like action, thus permitting the slide to remain stationary and be held by the shoe 44.

To manually release the dog 53 from interlocking engagement with the ratchet bar 55 and thus permit the slide 41 to be moved vertically to either raise or lower the straight edge bars 48 and 50, the same is provided with a finger piece equipped lever 57. The lower end of the ratchet bar 55 is connected to one of the arms of a bell crank 58 by a link 59. The bell crank 58 is pivoted to a bearing lug 60 extending forward from the face of the body 13 and the arm of said bell crank to which the link 59 is attached extends rearward through a vertical slot 61 in said body. The other arm of the bell crank 58 is attached to a rock shaft 62 by a crank-actuating arm 63 on said shaft. Said rock shaft 62 is journaled in bearings 64 projecting forward from the body 13 just above the base 17. The end portions of the rock shaft 62 extend outward of the bearings 64 and are made square in cross section for the application of a lever 65 for operating the same.

This lever 65 extends horizontally forward from the rock shaft 62 and has on its rear end a long socket sleeve 66 adapted to be telescoped onto either of the projecting ends of the rock shaft 62 and interlocked therewith for common rocking movement. A coiled spring 67 is attached to the bell crank 58 at its connection with the link 59 and anchored to the back of the body 13 above said bell crank. This coiled spring is under strain to normally hold the ratchet bar 55 raised through the link connection 59 and the free or outer end of the lever 65 raised through the bell crank 58 and crank arm 63 acting on the shaft 62.

To cause the slide 41 to move predetermined steps of downward movement and thereby selectively set the straight edge bars 48 and 50 for single, double or triple spacing, the lever 65 is provided with an adjustable stop 68, in the form of an upright stem, the lower end of which is arranged to engage the table top D as a base of resistance, as indicated by a single line in Fig. 1, and on which the typewriter A and copy holder are supported. This stop 68 is mounted in a bore-like seat in the outer end portion of the lever 65 and has on its upper end a rubber capped finger piece 69 by which the operator may depress the stop 68 to operate the lever 65. This stop 68 is held in its seat for longitudinal adjustment in the lever 65 for different line spacing by a U-shaped latch 70 that embraces said lever and has on its side members edgewise spaced ears 71 pivoted at 72 to said lever. The stop 68 extends through alined holes 73 in the side members of the latch 70 and is provided with upper, intermediate and lower pairs of circumferentially extended grooves 74, 75 and 76, respectively, into any one pair of which the side members of the latch 70 may be inserted to releasably lock said latch to the lever 65. A coiled spring 77, anchored to the lever 65, engages the intermediate portion of the latch 70 and yieldingly holds the same interlocked with the stop 68. To release the latch from the stop 68 it is only necessary to press the intermediate portion of the latch inward against the tension of the spring 77. When the latch 70 is interlocked with the grooves 74 or 75 or 76, said stop is positioned to cause the straight edge bars 48 and 50 to move steps of movement for single, double or triple spacing, respectively.

For variable or irregular spacing the stop 68 may be adjusted for trip spacing and the operator, by manipulating the lever 65 by slight touches can work the straight edge bars 48 and 50 down to the desired position. It is therefore evident that this device is capable of use for positive or for variable spacing.

Obviously, in line feeding movement less than that for which the stop 68 is set, the operation may be produced simply by pressing the lever 65 down a distance less than that required to bring the stop into action. When it is desirable to move the spring arms 23 into operative positions to release the same from the typewriter or apply the same thereto, the lever 65 may be detached from the rock shaft 62 and applied to either end of the rock shaft 26 to operate the same.

What we claim is:

1. In a holder of the kind described, the combination with a body and means for supporting the same, of a travelling member mounted on the body, a straight edge bar carried by said member, means including an operating lever for imparting steps of movement to said member, a stop mounted on the lever for relative adjustment and arranged to engage an abutment to limit the movement of the lever, and a latch for holding the stop in predetermined different adjustments in respect to the lever to cause said steps of movement to be of a selective predetermined length and the movement of the straight edge bar to be of a predetermined different line spacing.

2. The structure defined in claim 1 in which said stop is in the form of an upright stem having at its top a finger piece by which the lever may be operated and longitudinally spaced lock notches for the latch.

3. In a holder of the kind described, the combination with a body having a supporting base, of a rock shaft on the body, a pair of coiled springs encircling the rock shaft and having one of their ends engaging a base of resistance and their other ends affording a pair of arms arranged to engage the frame of a typewriter for attaching said holder thereto, said shaft having crank-actuating means operative on said arm to release the same under a turning movement of the rock shaft, and means for operating the rock shaft.

4. In a holder of the kind described, the combination with a body and means for supporting the same, of a travelling member mounted on the body, a straight edge bar carried by said member, means for imparting steps of movement to said member including a rock shaft, a second rock shaft on the body, a pair of coiled springs encircling the second rock shaft and having one of their ends engaging a base of resistance and their other ends affording a pair of arms arranged to engage the frame of a typewriter for attaching said holder thereto, said shaft having crank-actuating means operative on said arm to release the same under a turning movement of the second rock shaft, and a lever applicable to either rock shaft for operating the same.

In testimony whereof we affix our signatures.

HERMAN J. OSTDIEK.
CLARENCE J. OSTDIEK.